United States Patent
Becker et al.

(10) Patent No.: US 6,917,814 B2
(45) Date of Patent: Jul. 12, 2005

(54) METHOD AND MOBILE STATION FOR REPORTING MULTI-PATH SIGNALS BASED ON A REPORT WINDOW

(75) Inventors: Christopher Becker, Palatine, IL (US); Karthik Ramaswamy, Harvard, IL (US); Michael Carney, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 10/213,176

(22) Filed: Aug. 6, 2002

(65) Prior Publication Data

US 2004/0029589 A1 Feb. 12, 2004

(51) Int. Cl.$^7$ ............................. H04J 3/06; H04Q 7/00
(52) U.S. Cl. .................... 455/506; 455/10; 455/281; 455/303; 455/226.1; 370/342; 375/342
(58) Field of Search ................. 455/506, 524, 455/226.1, 334, 303, 281, 10, 502, 550.1, 67.11, 131, 296; 370/342, 498, 509, 320, 335, 479, 441, 209, 332; 375/147, 342, 200, 148, 140, 142, 267, 348

(56) References Cited

U.S. PATENT DOCUMENTS

| | | | |
|---|---|---|---|
| 5,881,058 A | * | 3/1999 | Chen ........................ 375/144 |
| 6,539,006 B1 | * | 3/2003 | Taylor ....................... 370/335 |
| 6,549,545 B1 | * | 4/2003 | Yamamoto et al. ........... 455/10 |
| 6,618,434 B2 | * | 9/2003 | Heidari-Bateni et al. ... 375/148 |

* cited by examiner

*Primary Examiner*—David Hudspeth
*Assistant Examiner*—Kamran Afshar
(74) *Attorney, Agent, or Firm*—Randall S. Vaas

(57) ABSTRACT

A method (500) and a mobile station (160) for reporting multi-path signals based on a report window are described herein. The mobile station (160) may determine a distribution of a plurality of multi-path signals observed by a receiving unit (220) within the mobile station (160). The mobile station (160) may determine a report window based on the distribution. Based on the report window, the mobile station (160) may report at least one of the plurality of multi-path signals.

22 Claims, 5 Drawing Sheets

160

US 6,917,814 B2

METHOD AND MOBILE STATION FOR REPORTING MULTI-PATH SIGNALS BASED ON A REPORT WINDOW

TECHNICAL FIELD

The present disclosure relates to wireless communication systems, and more particularly, to a method and a mobile station for reporting multi-path signals based on a report window.

BACKGROUND

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base stations as part of the base station subsystem to provide the mobile station with real-time voice, data, and multimedia services (e.g., a call).

Typically, the mobile station may detect the presence of multiple base stations that are operable to provide communication services to the mobile station. To assist with synchronization between the mobile station and those base stations, beacon signals are transmitted. In a Third Generation Partnership Project (3GPP) system, for example, the beacon signal is known as a primary synchronization code (PSC) that is transmitted once per slot. Each base station transmits the same beacon signal. However, the mobile station may receive different versions of a beacon signal from a single base station because the signal may reach the mobile station via a direct path and/or reflections off of objects such as buildings and mountains (i.e., multi-path signals). Because the 3GPP system may asynchronously distribute base stations, the mobile station may receive beacon signals from one base station that is not aligned in time with the beacon signal from another base station. Typically, the beacon signal from a host base station (i.e., the base station providing service to the cell in which the mobile station is currently located) may be received at the mobile station with more power than the beacon signals from base stations providing services to neighboring cells. That is, the beacon signal from the host base station may dominate a multi-path profile observed by the mobile station. As a result, the mobile station may not be able to report the strength of the neighboring base stations to the network.

One aspect of designing a wireless communication system is to optimize the resources available to the mobile station. In particular, one method of improving the availability of resources within the mobile station is to reduce the loading on the digital signal processor (DSP) and to reduce the number of direct memory access (DMA) transfers during a search for multi-path signals. To do so, the mobile station may need to control the number of multi-path signals reported in a search. Therefore, a need exists for a more effective means to report multi-path signals.

BRIEF DESCRIPTION OF THE DRAWINGS

This disclosure will describe several embodiments to illustrate its broad teachings. Reference is also made to the attached drawings.

DETAILED DESCRIPTION

Figure 1:
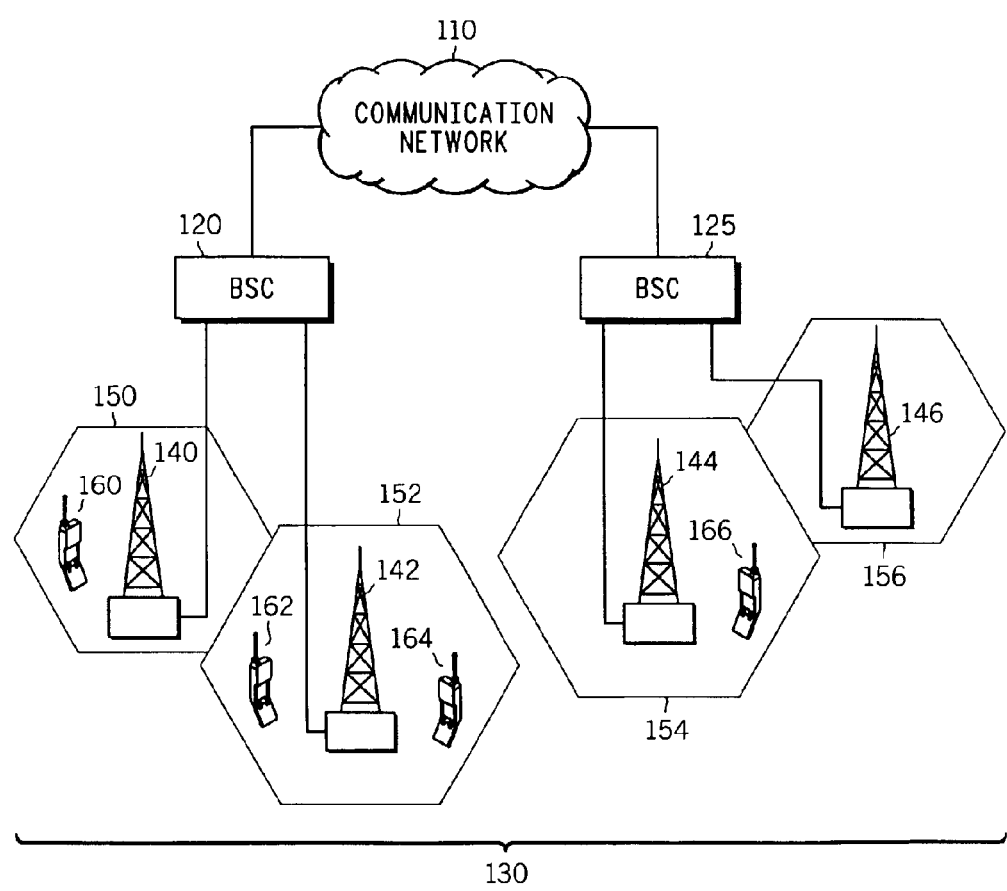
FIG. 1 is a block diagram representation of a wireless communication system.

A method and a mobile station for reporting multi-path signals based on a report window are described herein. The mobile station may observe multi-path signals during a search period. In a code division multiple access (CDMA) based communication system, for example, the search period may be one full slot, i.e., two-thirds of a millisecond ($\frac{2}{3}$ msec). Accordingly, the mobile station may determine a distribution of a plurality of multi-path signals observed by the mobile station during the search period. In particular, the mobile station may determine an energy parameter and a position parameter to generate an energy/position pair associated with each of the plurality of multi-path signals. Based on the distribution of the plurality of multi-path signals, the mobile station may determine a report window to report a predetermined number of energy/position pairs (N) for a current search. For example, the mobile station may determine a search period (SP) for a prior search, and an interval (T) associated with the predetermined number of energy/position pairs (N). That is, the mobile station may observe the predetermined number of energy/position pairs (N) within the interval (T) during the search period (SP) for the prior search. To avoid reporting duplicate multi-path signals from the prior search, the mobile station may subtract the interval (T) from the search period (SP) for the prior search to determine the report window (W) for the current search. The search period (SP) for the prior search may be, but is not limited to, one full slot (S). Thus, the report window (W) may be the difference between one full slot (S) and the interval (T). Alternatively, the report window may be, but is not limited to, a fraction of one full slot (S), i.e., S/n, wherein n is a whole number.

Based on the report window (W), the mobile station may report at least one of the plurality of multi-path signals. That is, the mobile station may report an energy/position pair associated with one of the plurality of multi-path signals in response to the position parameter of that particular energy/position pair being within the report window. To further optimize available resources (e.g., reduce the loading on the DSP and the number of DMA transfers), the mobile station may report only the predetermined number of energy/position pairs (N). In addition, the mobile station may report the energy/position pair within the report window in response to the energy parameter of that particular energy/position pair being less than an energy threshold. Here, the mobile station may report multi-path signals from neighboring base stations, which may have weaker multi-path signals than those from a host base station. Alternatively, the mobile station may report an energy/position pair associated with one of the plurality of multi-path signals based on both the energy parameter and the position parameter of the energy/position pair. For example, the mobile station may generate a first energy/position pair associated with a first multi-path signal, and a second energy/position pair associated with a second multi-path signal. Upon detecting that the difference between the position parameters of the first and second energy/position pairs is less than a position threshold (i.e., separated by a predetermined number of positions), the mobile station may compare the energy parameters of the first and second energy/position pairs and report the energy/position pair with the greater energy parameter.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, CDMA 2000, the Personal Communications System (PCS), 3G, the Universal Mobile Telecommunications System (UMTS) and variations and evolutions of these protocols. Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Although the method and mobile station disclosed herein are particularly well suited for use with a wireless communication system operating in accordance with CDMA based communication protocols such as a WCDMA based communication protocol, persons of ordinary skill in the art will readily appreciate that the teachings of the invention are in no way limited to those communication protocols. On the contrary, persons of ordinary skill in the art will readily appreciate that the teachings of the invention can be employed with other wireless communication protocols.

Figure 2:
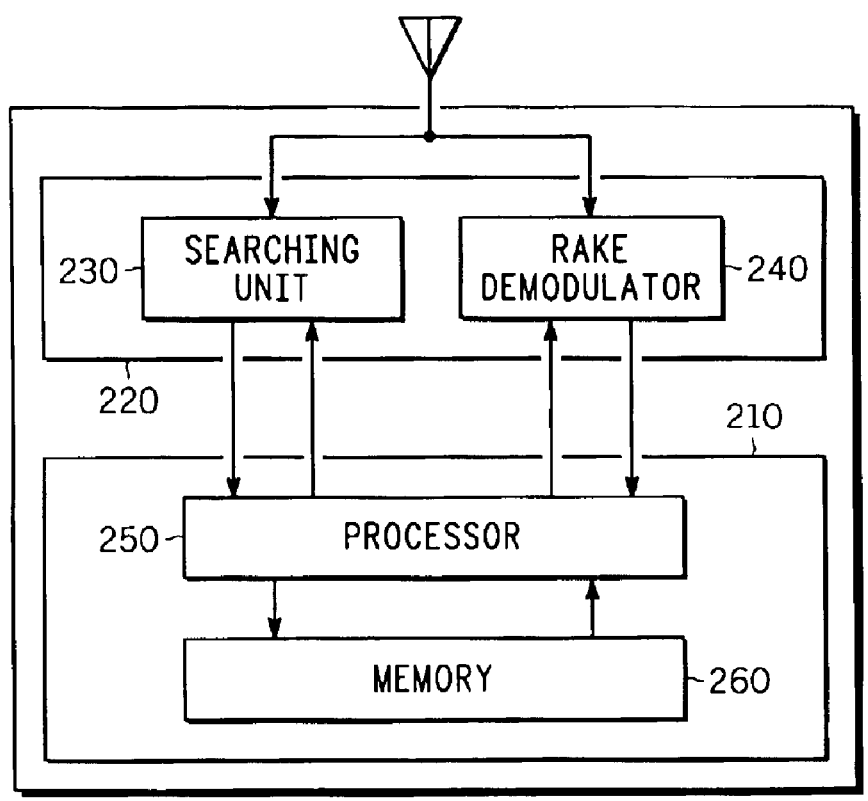
FIG. 2 is a block diagram representation of a mobile station.

Referring to FIG. 2, a mobile station (one shown as 160 in FIG. 1) adapted to report multi-path signals based on a report window is shown. The mobile station 160 generally includes a controller 210, and a receiving unit 220. The receiving unit 220 may include, but is not limited to, a searching unit 230 and a RAKE demodulator 240. The controller 210 includes a processor 250 and a memory 260. The processor 250 (e.g., a digital signal processor (DSP) or a microprocessor) is operatively coupled to the memory 260, which stores a program or a set of operating instructions for the processor 250. The processor 250 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The controller 210 may be operatively coupled to the receiving unit 220, which may be, but is not limited to, a RAKE receiver as persons of ordinary skill in the art will readily recognize. As noted above, the mobile station 160 may receive different versions of an original signal (i.e., multi-path signals) from a base station (e.g., one shown as BS 140 in FIG. 1) because the signal may reach the mobile station 160 via a direct path and/or reflections off of objects such as buildings and mountains. Thus, the receiving unit 220 (e.g., via the RAKE demodulator 240) may be configured to demodulate multi-path signals so that the original signal may be retrieved. The searching unit 230 may be configured to report multi-path signals observed by the mobile station 160. Persons of ordinary skill in the art will readily appreciate that the controller 210 and the receiving unit 220 may be separate components as shown in FIG. 2 or integrated into a single component.

Figure 3:
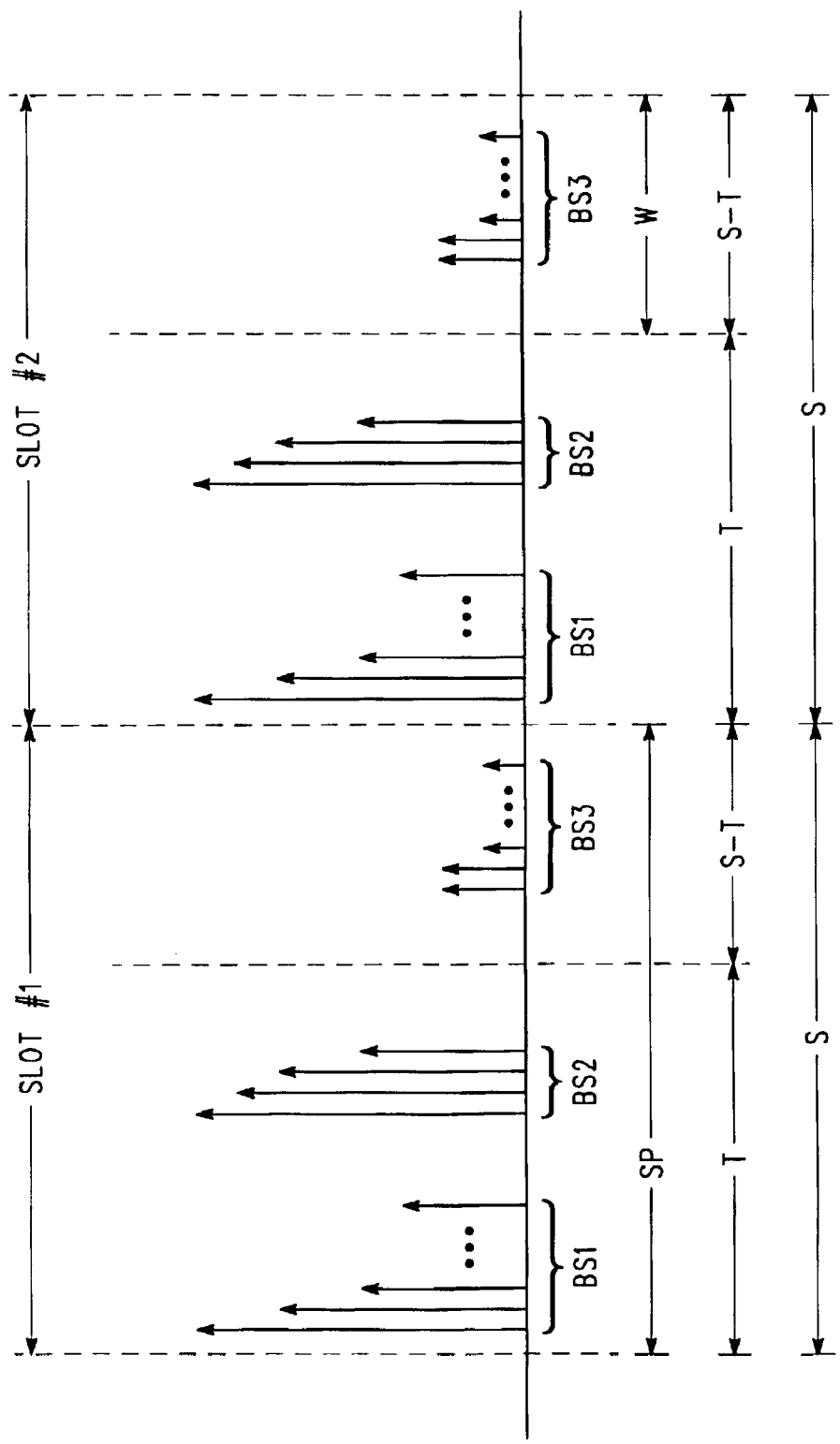
FIGS. 3 and 4 are visual representations of multi-path signal profiles associated with the mobile station.

A basic flow for reporting multi-path signals based on a report window that may be applied with the mobile station 160 shown in FIG. 2 may start with the mobile station 160 (e.g., via the searching unit 230) enabling a first search (SLOT #1) to observe multi-path signals. During a search period (SP) for the first search (SLOT #1), the mobile station 160 may determine a distribution of a plurality of multi-path signals with a profile as shown in FIG. 3. In particular, the mobile station 160 may observe a plurality of multi-path signals from each of a plurality of base stations BS1, BS2, and BS3 (e.g., shown as 140, 142, and 144 in FIG. 1). In a 3GPPP system, for example, the search period (SP) may be, but is not limited to, one full slot (S), e.g., two-thirds of a millisecond (⅔ msec). Initially, the mobile station 160 may be set to report a predetermined number of energy/position pairs (N) associated with multi-path signals observed by the mobile station 160 during the search period (SP). Each energy/position pair may correspond to an energy parameter and a position parameter of one of the plurality of multi-path signals observed by the mobile station 160. The energy parameter (i.e., the height of an energy/position pair as shown in FIG. 3) may correspond to the energy or signal strength of a particular multi-path signal. The position parameter (i.e., the location of an energy/position pair) may correspond to the delay or offset of the particular multi-path signal relative to a time reference within the searching unit 230.

In a 3GPP system, for example, the mobile station 160 may typically report 5,120 energy/position pairs during one full slot (S). Although the predetermined number of energy/position pairs (N) may be set to report all energy/position pairs observed during a particular search period, the mobile station 160 may be set to report a smaller number of energy/position pairs to optimize resources (i.e., reduce memory size and power consumption of the mobile station 160). For example, the mobile station 160 may be set to report eight (8) of the strongest energy/position pairs (i.e., multi-path signals with eight (8) of the largest energy parameters) during the search period (SP). Typically, a plurality of multi-path signals from a host base station such as the first base station 140 (BS1) may have larger energy parameters than a plurality of multi-path signals from a neighboring base station such as the second and third base stations 142, 144 (BS2, BS3). As shown in FIG. 3, the mobile station 160 may satisfy the predetermined number of eight energy/positions pairs (N) simply from the first and second base stations 140 and 142 (BS1 and BS2). Because the energy/position pairs associated with the third base station 144 (BS3) may have weaker energy parameters, those energy/position pairs may not be reported during the search period (SP) for the first search (SLOT #1).

To ensure that the energy/position pairs from all three base stations 140, 142, and 144 (BS1, BS2, and BS3) may be reported, the mobile station 160 may determine a report window (W) for a second search (SLOT #2). For example, the mobile station 160 may determine the search period (SP) for the first search (SLOT #1). Based on the multi-path signals observed by the mobile station 160 during the search period (SP) and the predetermined number of energy/position pairs (N), the mobile station 160 may determine an interval (T) associated with the predetermined number of energy/position pairs (N). As shown in FIG. 3, the mobile station 160 may satisfy the predetermined number of energy/position pairs (N) within the interval (T), i.e., the energy/position pairs associated with the plurality of multi-path signals from the first and second base stations 140 and 142 (BS1 and BS2). To determine the report window (W) for the second search (SLOT #2), the mobile station 160 may subtract the interval (T) from the first search period (SP). With the search period (SP) for the first search (SLOT #1) being one full slot (S) as an example, the report window (W) may be less than or equal to the difference between the interval (T) and one full slot (S), i.e., S−T>=W. Instead of reporting the same multi-path signals reported in the first search (SLOT #1), the mobile station 160 may report multi-path signals observed during the report window (W) for the second search (SLOT #2). The mobile station 160 may observe a plurality of multi-path signals from the third base station 144 (BS3) during the report window (W). Thus, the mobile station 160 may avoid reporting the plurality of multi-path signals from the first and second base stations 140, 142 (BS1 and BS2) again, and report only the plurality of multi-path signals from the third base station 144 (BS3) during the second search (SLOT #2). In doing so, the mobile station 160 may consume less power because the searching unit 230 of the mobile station 160 may be disabled during the interval (T), and report only the energy/position pairs within the report window (W) in the search (SLOT #2).

Figure 4:
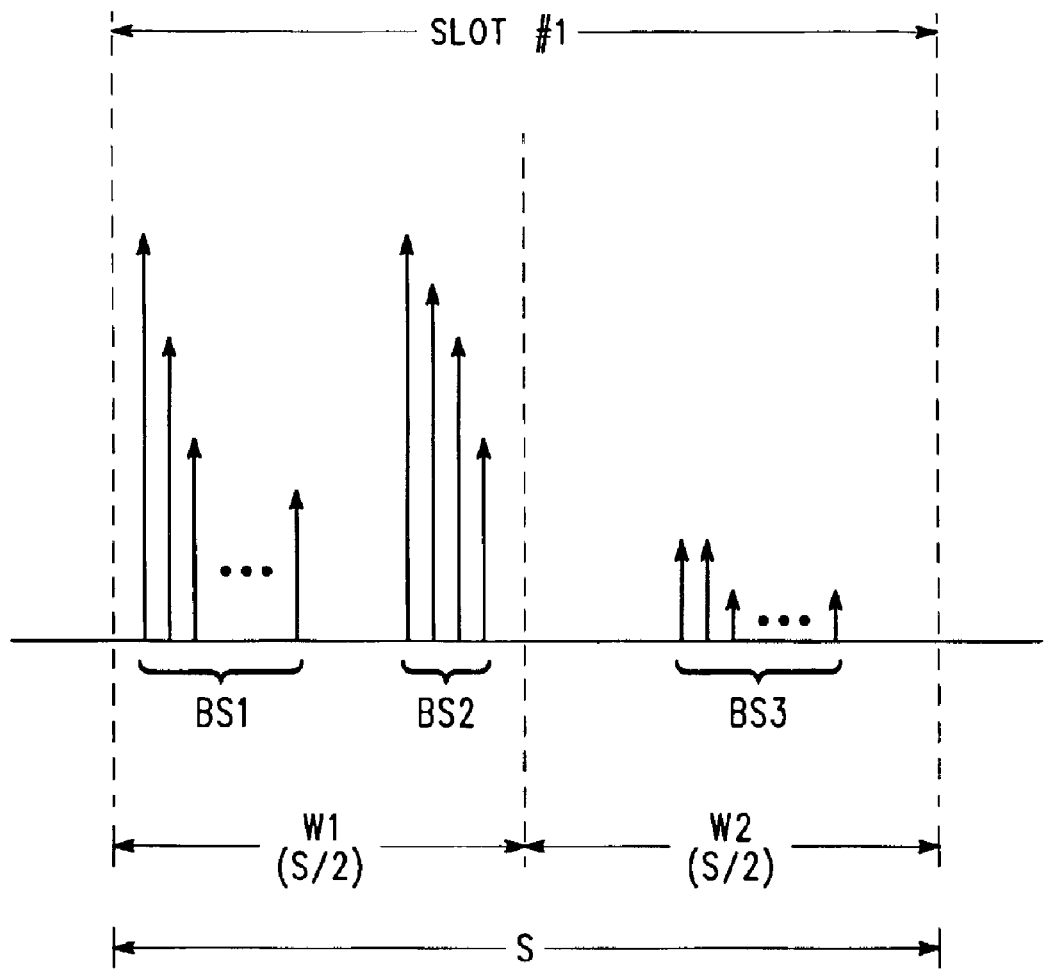

Alternatively, the mobile station 160 may determine a report window (W) that is a fraction of a search period such as, but not limited to, one-half (½), one-third (⅓), and one-fourth (¼). Referring to FIG. 4, for example, the mobile station 160 may determine a plurality of report windows such as, but not limited to, a first report window (W1) and a second report window (W2). With the search period (SP) being one full slot (S), each of the first and second report windows (W1 and W2) may be one-half of one full slot (S/2). During each of the first and second report windows (W1 and W2), the mobile station 160 may report the predetermined number of energy/position pairs (N). Following the example described above, the predetermined number of energy/position pairs (N) may be set eight (8). Accordingly, the mobile station may report eight (8) of the strongest energy/position pairs associated with the plurality of multi-path signals observed within each of the first and second report windows (W1 and W2). The mobile station 160 may report the plurality of multi-path signals from the first and second base stations 140, 142 (BS1 and BS2) during the first report window (W1), and report the plurality of multi-path signals from the third base station 144 (BS3) during the second report window (W2). As a result, the energy/position pairs from all three base stations 140, 142, and 144 (BS1, BS2, and BS3) may be reported to the communication network 110.

Figure 5:
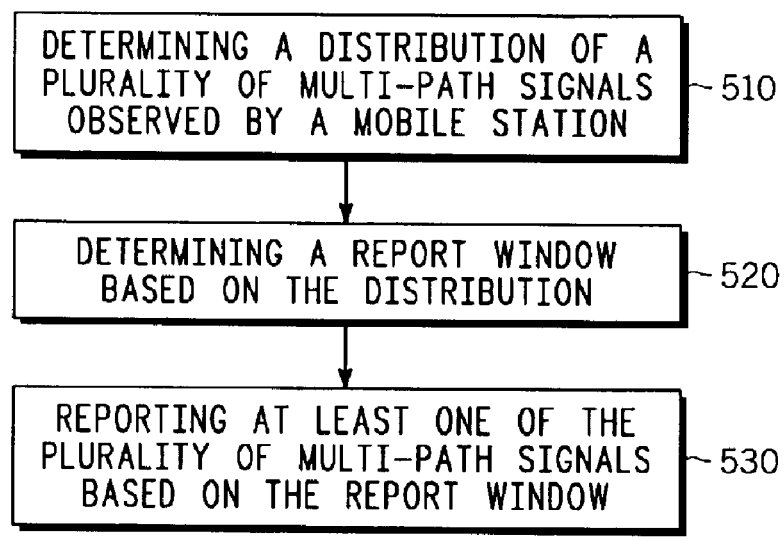
FIG. 5 is a flow diagram illustrating a method for reporting multi-path signals based on a report window.

One possible implementation of the computer program executed by the mobile station (e.g., via the processor 250) is illustrated in FIG. 5. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 5, persons of ordinary skill in the art will appreciate that these steps can be performed in other temporal sequences. Again, the flow chart 500 is merely provided as an example of one way to program the mobile station 160 to report multi-path signals based on a report window.

Initially, the mobile station 160 may be set to report a pre-determined number of energy/position pairs (N) based on multi-path signals observed by the mobile station 160 during a search. The flow chart 500 begins at step 510, wherein the mobile station 160 may determine a distribution of a plurality of multi-path signals observed by the mobile station 160. In particular, the mobile station 160 may determine an energy/position pair associated with each of the plurality of multi-path signals. Each energy/position pair may correspond to an energy parameter and a position parameter of one of the plurality of multi-path signals. At step 520, the mobile station 160 may determine a report window (W) based on the distribution to report the predetermined number of energy/position pairs. For example, the report window may be a fraction of a search period (SP) such as, but not limited to, one-half of one full slot (S/2), and one-third of one full slot (S/3). Alternatively, the mobile station 160 may determine the search period (SP) for a prior search, and an interval associated with the predetermined number of energy/position pairs (T) to avoid reporting duplicate energy/position pairs during a current search. For example, a plurality of multi-path signals from a neighboring base station may not have been reported during the prior search because those multi-path signals may have weaker energy parameters than a plurality of multi-path signals from a host base station. During the prior search, the mobile station 160 may have observed enough multi-path signals to report the predetermined number of energy/position pairs (N) with the interval (T). To avoid reporting duplicate energy/position pairs from the prior search, the mobile station 160 may determine the report window by subtracting the interval (T) from the search period (SP), e.g., the report window (W) may be less than or equal to the difference between one full slot (S) and the interval (T). Accordingly, the mobile station 160 at step 530 may report at least one of the plurality of multi-path signals based on the report window (W). For example, the mobile station 160 may report an energy/position pair in response to the position parameter of the energy/position pair being within the report window (W). To further optimize available resources, the mobile station 160 may report an energy/position pair within the report window (W) in response to the energy parameter of the energy/position pair being less than an energy threshold. Alternatively, the mobile station 160 may compare the position parameters of a first energy/position pair and a second energy/position pair prior to reporting one of the two energy/position pairs. Upon detecting that the difference between the position parameters of the first and second energy/position pairs is less than a position threshold, the mobile station 160 may compare the energy parameters of the first and second energy/position pairs. Accordingly, the mobile station 160 may report the energy/position pair with a greater energy parameter. As a result, the mobile station 160 may optimize available resources by reporting the predetermined number of energy/position pairs based on a report window.

Many changes and modifications to the embodiments described herein could be made. The scope of some changes is discussed above. The scope of others will become apparent from the appended claims.

What is claimed is:

1. In a wireless communication system, wherein a receiving unit is operable to search for multi-path signals, a method for reporting multi-path signals based on a report window, the method comprising:
   determining a distribution of a plurality of multi-path signals observed by the receiving unit;
   determining a report window based on the distribution, wherein determining the report window comprises:
      determining a search period for a search;
      determining an interval associated with a predetermined number of energy/position pairs, each of the energy/position pairs being associated with one of the plurality of multi-path signals; and
      subtracting the interval from the search period to determine the report window; and
   reporting at least one of the plurality of multi-path signals based on the report window.

2. In a wireless communication system, wherein a receiving unit is operable to search for multi-path signals, a method for reporting multi-path signals based on a report window, the method comprising:
   determining a distribution of a plurality of multi-path signals observed by the receiving unit;
   determining a report window based on the distribution; and
   reporting at least one of the plurality of multi-path signals based on the report window, wherein reporting at least one of the plurality of multi-path signals based on the report window comprises:
      generating a first energy/position pair associated with a first multi-path signal and a second energy/position pair associated with a second multi-path signal, each of the first and second energy/position pairs including an energy parameter and a position parameter;
      detecting a difference between the position parameters of the first and second energy/position pairs being less than a position threshold; and
      reporting the first energy/position pair in response to the energy parameter of the first energy/position pair being greater than the energy parameter of the second energy/position pair.

3. The method of claim 2, wherein the step of determining a distribution of a plurality of multi-path signals observed by the receiving unit comprises determining an energy parameter and a position parameter associated with each of the plurality of multi-path signals observed by the receiving unit.

4. The method of claim 2, wherein the step of determining a report window comprises determining a report window being a fraction of a search period.

5. The method of claim 2, wherein the step of reporting at least one of the plurality of multi-path signals based on the report window comprises:
   generating an energy/position pair associated with one of the plurality of multi-path signals, the energy/position pair including a position parameter; and
   reporting the energy/position pair in response to the position parameter being within the report window.

6. The method of claim 2, wherein the communication system comprises a code division multiple access (CDMA) based communication system.

7. In a wireless communication system, wherein a receiving unit is operable to search for multi-path signals, a method for reporting multi-path signals based on a report window, the method comprising:
   determining a distribution of a plurality of multi-path signals observed by the receiving unit;
   determining a report window based on the distribution; and
   reporting at least one of the plurality of multi-path signals based on the report window, wherein reporting at least one of the plurality of multi-path signals based on the report window comprises:
      generating an energy/position pair associated with one of the plurality of multi-path signals, the energy/position pair including an energy parameter; and
      reporting the energy/position pair in response to the energy parameter being less than an energy threshold.

8. In a wireless communication system, a mobile station for reporting multi-path signals based on a report window, the mobile station comprising:
   a receiving unit operable to observe a plurality of multi-path signals; and
   a controller operatively coupled to the searching unit, the controller comprising a processor and a memory operatively coupled to the processor,
   the controller being programmed to determine a distribution of a plurality of multi-path signals observed by the receiving unit,
   the controller being programmed to determine a report window based on the distribution; and
   the controller being programmed to report at least one of the plurality of multi-path signals based on the report window, wherein the report window is a difference between a search period for a search and an interval associated with a predetermined number of energy/position pairs, each of the energy/position pairs being associated with one of the plurality of multi-path signals.

9. The mobile station of claim 8, wherein the distribution of a plurality of multi-path signals comprises an energy parameter and a position parameter associated with each of the plurality of multi-path signals observed by the mobile station.

10. The mobile station of claim 8, wherein the report window is a fraction of a search period.

11. The mobile station of claim 8, wherein the controller is programmed to generate an energy/position pair associated with one of the plurality of multi-path signals, the energy/position pair including a position parameter, and wherein the controller is programmed to report the energy/position pair in response to the position parameter being within the report window.

12. The mobile station of claim 8 is operable in accordance with a code division multiple access (CDMA) based communication protocol.

13. In a wireless communication system, a mobile station for reporting multi-path signals based on a report window, the mobile station comprising:
 a receiving unit operable to observe a plurality of multi-path signals; and
 a controller operatively coupled to the searching unit, the controller comprising a processor and a memory operatively coupled to the processor,
 the controller being programmed to determine a distribution of a plurality of multi-path signals observed by the receiving unit,
 the controller being programmed to determine a report window based on the distribution;
 the controller being programmed to report at least one of the plurality of multi-path signals based on the report window;
 the controller being programmed to generate an energy/position pair associated with one of the plurality of multi-path signals, the energy/position pair including an energy parameter; and
 the controller being programmed to report the energy/position pair in response to the energy parameter being less than an energy threshold.

14. In a wireless communication system, a mobile station for reporting multi-path signals based on a report window, the mobile station comprising:
 a receiving unit operable to observe a plurality of multi-path signals; and
 a controller operatively coupled to the searching unit, the controller comprising a processor and a memory operatively coupled to the processor,
 the controller being programmed to determine a distribution of a plurality of multi-path signals observed by the receiving unit,
 the controller being programmed to determine a report window based on the distribution;
 the controller being programmed to report at least one of the plurality of multi-path signals based on the report window;
 the controller being programmed to generate a first energy/position pair associated with a first multi-path signal and a second energy/position pair associated with a second multi-path signal, each of the first and second energy/position pairs including an energy parameter and a position parameter, wherein the controller is programmed to detect a difference between the position parameters of the first and second energy/position pairs being less than a position threshold, and wherein the controller is programmed to report the first energy/position pair in response to the energy parameter of the first energy/position pair being greater than the energy parameter of the second energy/position pair.

15. In a wireless communication system, wherein a mobile station is operable to search for multi-path signals, and wherein the processor operates in accordance with a computer program embodied on a computer-readable medium for reporting multi-path signals based on a report window, the computer program comprising:
 a first routine that directs the processor to determine a distribution of a plurality of multi-path signals observed by the mobile station;
 a second routine that directs the processor to determine a report window based on the distribution, wherein the second routine comprises:
  a routine that directs the processor to determine a search period for a search;
  a routine that directs the processor to determine an interval associated with a predetermined number of energy/position pairs, each of the energy/position pairs being associated with one of the plurality of multi-path signals; and
  a routine that directs the processor to subtract the interval from the search period to determine the report window; and
 a third routine that directs the processor to report at least one of the plurality of multi-path signals based on the report window.

16. In a wireless communication system, wherein a mobile station is operable to search for multi-path signals, and wherein the processor operates in accordance with a computer program embodied on a computer-readable medium for reporting multi-path signals based on a report window, the computer program comprising:
 a first routine that directs the processor to determine a distribution of a plurality of multi-path signals observed by the mobile station;
 a second routine that directs the processor to determine a report window based on the distribution; and
 a third routine that directs the processor to report at least one of the plurality of multi-path signals based on the report window, wherein the third routine comprises:
  a routine that directs the processor to generate an energy/position pair associated with one of the plurality of multi-path signals, the energy/position pair including an energy parameter; and
  a routine that directs the processor to report the energy/position pair in response to the energy parameter being less than an energy threshold.

17. In a wireless communication system, wherein a mobile station is operable to search for multi-path signals, and wherein the processor operates in accordance with a computer program embodied on a computer-readable medium for reporting multi-path signals based on a report window, the computer program comprising:
 a first routine that directs the processor to determine a distribution of a plurality of multi-path signals observed by the mobile station;
 a second routine that directs the processor to determine a report window based on the distribution; and
 a third routine that directs the processor to report at least one of the plurality of multi-path signals based on the report window, wherein the third routine comprises:
  a routine that directs the processor to generate a first energy/position pair associated with a first multi-path signal and a second energy/position pair associated with a second multi-path signal, each of the first and second energy/position pairs including an energy parameter and a position parameter;
  a routine that directs the processor to detect a difference between the position parameters of the first and second energy/position pairs being less than a position threshold; and a routine that directs the processor to report the first energy/position pair in response to the energy parameter of the first energy/position pair being greater than the energy parameter of the second energy/position pair.

18. The computer program of claim 17, wherein the first routine comprises a routine that directs the processor to determine an energy parameter and a position parameter associated with each of the plurality of multi-path signals observed by the mobile station.

19. The computer program of claim 17, wherein the second routine comprises a routine that directs the processor to determine a report window being a fraction of a search period.

20. The computer program of claim 17, wherein the third routine comprises:

a routine that directs the processor to generate an energy/position pair associated with one of the plurality of multi-path signals, the energy/position pair including a position parameter; and a routine that directs the processor report the energy/position pair in response to the position parameter being within the report window.

21. The computer program of claim 17 is operable in accordance with a code division multiple access (CDMA) based communication system.

22. The computer program of claim 17, wherein the medium is one of paper, a programmable gate array, application specific integrated circuit, erasable programmable read only memory, read only memory, random access memory, magnetic media, and optical media.

* * * * *